US009104096B2

(12) United States Patent
Koike

(10) Patent No.: US 9,104,096 B2
(45) Date of Patent: Aug. 11, 2015

(54) 3D-IMAGE DISPLAY APPARATUS, 3D-IMAGE CAPTURING APPARATUS, AND 3D-IMAGE DISPLAY METHOD USING LONGITUDINAL LINE IMAGES FOR PARALLAX INFORMATION

(75) Inventor: Tsutomu Koike, Yokohama (JP)

(73) Assignee: JVC KENWOOD CORPORATION (JP)

( * ) Notice: Subject to any disclaimer, the term of this patent is extended or adjusted under 35 U.S.C. 154(b) by 319 days.

(21) Appl. No.: 13/595,122

(22) Filed: Aug. 27, 2012

(65) Prior Publication Data

US 2012/0320050 A1 Dec. 20, 2012

Related U.S. Application Data

(63) Continuation-in-part of application No. PCT/JP2011/053860, filed on Feb. 22, 2011.

(30) Foreign Application Priority Data

Mar. 30, 2010 (JP) .................................. 2010-076484

(51) Int. Cl.
*G09G 5/00* (2006.01)
*G03B 35/10* (2006.01)
*G03B 35/24* (2006.01)
(Continued)

(52) U.S. Cl.
CPC ................ *G03B 35/10* (2013.01); *G03B 35/24* (2013.01); *H04N 13/0022* (2013.01); *H04N 13/004* (2013.01); *H04N 13/007* (2013.01); *H04N 13/0029* (2013.01); *H04N 13/0239* (2013.01); *H04N 13/0296* (2013.01); *H04N 13/0497* (2013.01); *H04N 2013/0081* (2013.01)

(58) Field of Classification Search
CPC ................................ G06T 15/00; H04N 13/00
USPC .................................................. 345/419, 629
See application file for complete search history.

(56) References Cited

U.S. PATENT DOCUMENTS

2004/0233275 A1* 11/2004 Tomita ............................. 348/51
2006/0126919 A1* 6/2006 Kitaura et al. ................. 382/154
(Continued)

FOREIGN PATENT DOCUMENTS

JP 06050736 2/1994
JP 10322725 12/1998
(Continued)

*Primary Examiner* — Ke Xiao
*Assistant Examiner* — Weiming He
(74) *Attorney, Agent, or Firm* — Cantor Colburn LLP

(57) ABSTRACT

A stereoscopic image display apparatus includes: an image data acquiring unit which acquires two pieces of image data having horizontal parallax; a composition unit which generates display data by composing the two pieces of image data; a line image overlapping unit which overlaps two longitudinal line images with an image based on the display data, and independently moves the two longitudinal line images in a horizontal direction; a parallax information derivation unit which derives parallax information about parallax between the two longitudinal line images; a parallax information overlapping unit which additionally overlaps the parallax information with the image based on the display data; and a display unit which displays the images based on the display data, on which the longitudinal line images and the parallax information are overlapped, such that a producer may easily and accurately identify parallax of each subject image in the display data.

8 Claims, 11 Drawing Sheets

(51) Int. Cl.
*H04N 13/00* (2006.01)
*H04N 13/02* (2006.01)
*H04N 13/04* (2006.01)

(56) References Cited

U.S. PATENT DOCUMENTS

2007/0285663 A1* 12/2007 Hewitt et al. ................ 356/399
2008/0201641 A1* 8/2008 Xie ............................... 715/733
2011/0037964 A1* 2/2011 Imamura ..................... 356/3.13
2011/0242104 A1* 10/2011 Zhang et al. ................. 345/419

FOREIGN PATENT DOCUMENTS

| | | |
|---|---|---|
| JP | 2002245451 | 8/2002 |
| JP | 2004349736 | 12/2004 |
| JP | 2005142819 | 6/2005 |

* cited by examiner

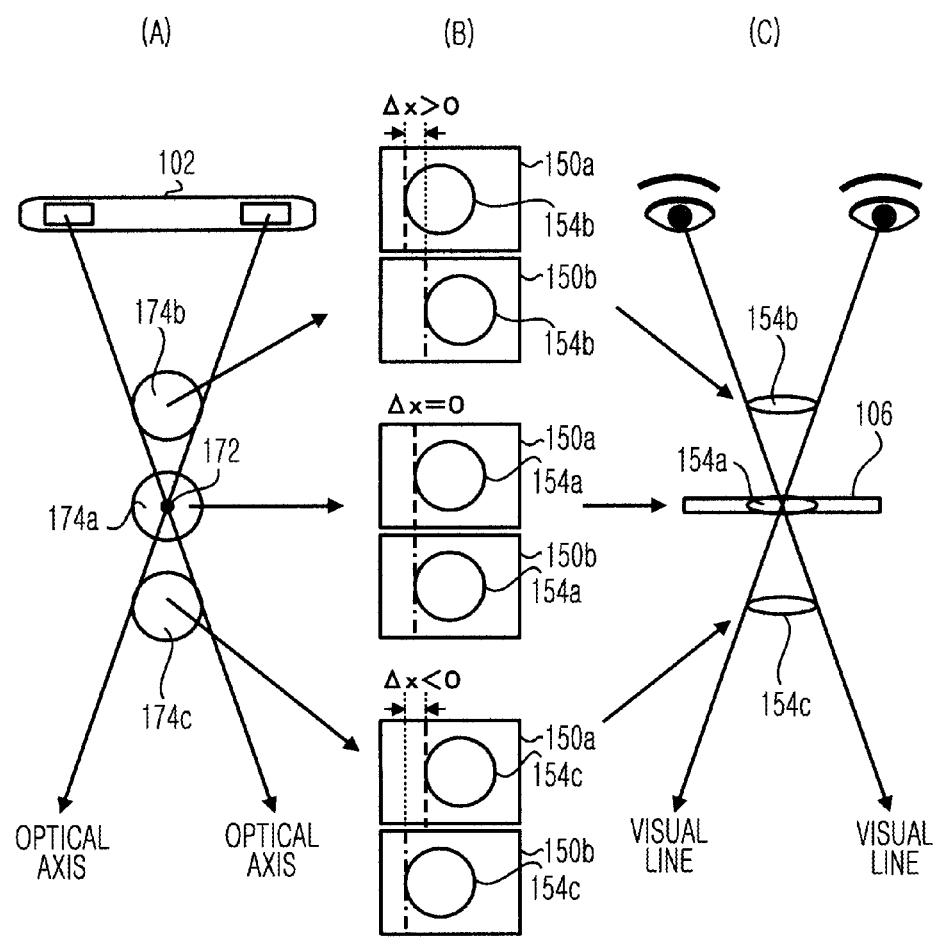

3D-IMAGE DISPLAY APPARATUS, 3D-IMAGE CAPTURING APPARATUS, AND 3D-IMAGE DISPLAY METHOD USING LONGITUDINAL LINE IMAGES FOR PARALLAX INFORMATION

CROSS REFERENCE TO RELATED APPLICATIONS

This application is a continuation-in-part application of International application No. PCT/JP2011/053860, filed on Feb. 22, 2011, which claims priority from Japanese Patent Applications No. 2010-076484 filed on Mar. 30, 2010, the entire contents of which are incorporated herein by reference.

BACKGROUND OF THE INVENTION

1. Field of the Invention

The present invention relates to a stereoscopic (3D) image display apparatus, a stereoscopic image capturing apparatus, and a stereoscopic image display method for displaying an image based on display data for allowing a viewer to perceive a stereoscopic image.

2. Description of the Related Art

Recently, a stereoscopic image technology that provides two images having horizontal parallax (binocular parallax) on a display so that a viewer may perceive the displayed images as a stereoscopic image of a subject has been highlighted. The two images used in the above technology are images captured from different optical axes (viewpoints), or images of computer graphics (CGs) corresponding to images captured at different optical axes. A location where a subject image included in the two images in a perspective direction is formed is determined according to a size of parallax between the two images of the subject.

As described above, the image forming location of the subject image in the perspective direction may be changed by adjusting the parallax between the two images of the subject. However, if the subject image is formed to excessively protrude or to excessively be recessed by having the parallax too large, the viewer may feel fatigue. Therefore, a producer (operator) who produces the two images processes image data obtained by an imaging operation or a CG producing operation into display data for allowing the viewer to perceive the stereoscopic image whenever the image data is generated, and displays an image based on the display data on a stereoscopic image display apparatus in order to check whether the size of parallax of the subject image is maintained within an appropriate range. However, in most cases, the producer has to determine the size of the parallax by using a scale on the stereoscopic image display apparatus, or based on experiences or intuition of the producer, and thus it takes a lot of efforts.

Thus, a technology of overlapping a guide functioning as a template with an image and allowing a person capturing the image to identify parallax between left image data and right image data has been suggested (Patent Document 1).

According to the Patent Document 1, since a guide is fixedly disposed, a subject image, in which parallax is to be derived, hardly overlaps with the fixed guide. Therefore, the producer has to estimate the parallax between images of the subject with naked eyes based on the guide that is separated from the subject image, and thus it is difficult to exactly determine whether the size of the parallax is maintained within an appropriate range. In addition, although the producer may determine whether there is parallax between images or not, it is difficult to observe visually a relative location of the subject image in a horizontal direction in display data that is obtained by composing two pieces of image data, and it cannot be determined whether the parallax is generated on a protrusion side or a recessed side. In addition, in a relatively small screen such as a small-sized monitor or a view finder, a reference for visually observing the parallax is not sufficient and thus it is very difficult to determine the parallax. As such, according to the parallax determination using naked eyes, the parallax may not be accurately defined, and moreover the producer has to spend a lot of time and effort to perform a comparison operation between the guide and the parallax.

Also, the producer briefly determines whether an image is adopted or not by displaying the image based on image data generated by an imaging operation or a CG producing operation, on a small-sized monitor or a view finder. However, the image data may be produced to be displayed on a large-sized screen of a theater. When sizes of display screens for displaying the display data are different from each other, parallax is also changed, and thus a stereoscopic effect in a small-sized monitor becomes different from a stereoscopic effect in a large-sized screen. Parallax in an arbitrary display screen may be estimated by multiplying a ratio of parallax with respect to a display width of the display data in a horizontal direction with a magnification (variation ratio) of the display screen. However, since the parallax of the display data is not determined accurately, estimation of parallax in an arbitrary display screen is not possible.

To address the above problems, the present invention provides a stereoscopic image display apparatus, a stereoscopic image capturing apparatus, and a stereoscopic image display method capable of allowing a producer to calculate parallax of each of subject images in display data easily and accurately.

(Patent Document 1) Japanese Laid-open Patent Publication No. 10-322725

SUMMARY OF THE INVENTION

According to an aspect of the present invention, there is provided a stereoscopic image display apparatus including: an image data acquiring unit which acquires two pieces of image data having horizontal parallax; a composition unit which generates display data by composing the two pieces of image data; a line image overlapping unit which overlaps two longitudinal line images extending in a vertical direction with an image based on the display data, and independently moves the two longitudinal line images in a horizontal direction according to a manipulation input of a user; a parallax information derivation unit which derives parallax information on parallax between the two longitudinal line images; a parallax information overlapping unit which additionally overlaps the parallax information with the image based on the display data, on which the longitudinal line images are overlapped; and a display unit which displays the images based on the display data, on which the longitudinal line images and the parallax information are overlapped.

According to another aspect of the present invention, there is provided a stereoscopic image capturing apparatus including: an imaging unit which generates two pieces of image data respectively from two optical axes that are arranged to be nearly parallel with each other or cross each other in an imaging direction; a composition unit which generates display data by composing the two pieces of image data; a line image overlapping unit which overlaps two longitudinal line images extending in a vertical direction with an image based on the display data, and independently moves the two longitudinal line images in a horizontal direction according to a manipulation input of a user; a parallax information derivation unit which derives parallax information on parallax between the two longitudinal line images; a parallax information overlapping unit which additionally overlaps the parallax information with the image based on the display data, on which the longitudinal line images are overlapped; and a display unit which displays the images based on the display data, on which the longitudinal line images and the parallax information are overlapped.

According to another aspect of the present invention, there is provided a stereoscopic image display method including: acquiring two pieces of image data having horizontal parallax; generating display data by composing the two pieces of image data; overlapping a horizontal line image extending in a horizontal direction with an image based on the display data, and moving the horizontal line image in a vertical direction according to a manipulation input of a user; overlapping two longitudinal line images extending in the vertical direction with the image based on the display data, during moving of one of the two longitudinal line images in the horizontal direction according to the manipulation input of the user, only composing the image data corresponding to one of the longitudinal line images, and during moving of the other longitudinal line image between the two longitudinal line images in the horizontal direction according to the manipulation input of the user, only composing the image data corresponding to the other longitudinal line image; deriving parallax information on parallax between the two longitudinal line images; additionally overlapping the parallax information with the image based on the display data, on which the longitudinal line images are overlapped; and displaying the image based on the display data, on which the longitudinal line images and the parallax information are overlapped.

BRIEF DESCRIPTION OF THE DRAWINGS

FIG. 7 is diagrams for explaining relative locations of parallax in a horizontal direction;

DETAILED DESCRIPTION OF THE INVENTION

Figure 1:
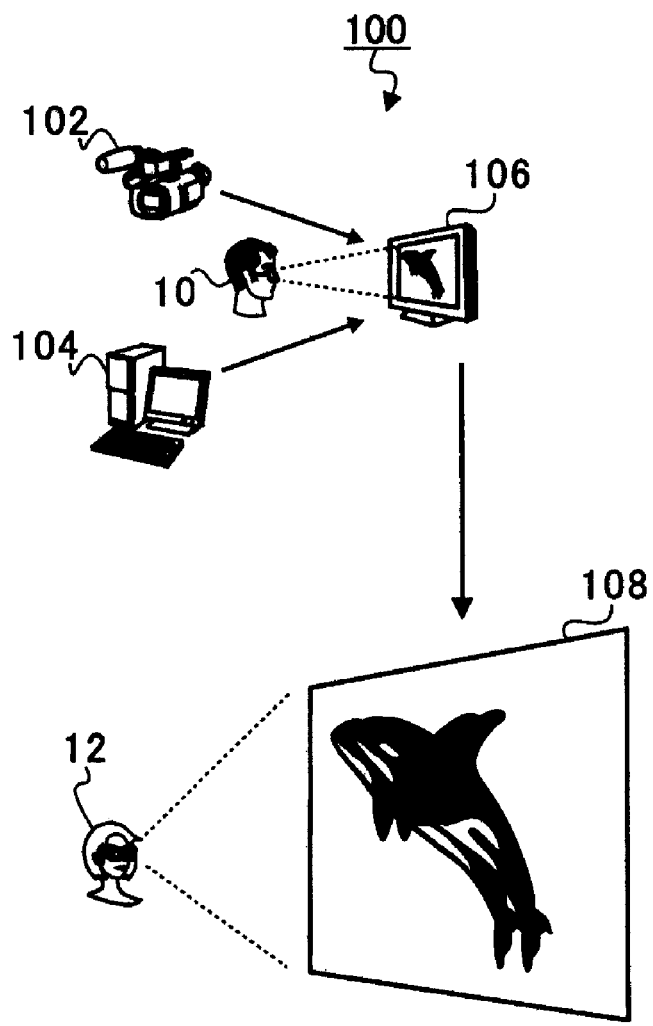
FIG. 1 is a functional block diagram schematically showing a stereoscopic image producing system.

Hereinafter, embodiments of the present invention will be described in detail with reference to accompanying drawings. Dimensions, materials, and detailed numerical values in the embodiments of the present invention are examples for allowing the invention to be fully understandable, and the present invention is not limited thereto. In addition, in the present specification and drawings, like reference numerals in the drawings denote like elements having like functions and configurations, and elements that are not directly relevant with the present invention are not provided.

(Stereoscopic Image Producing System (100))

FIG. 1 is a functional block diagram schematically showing a stereoscopic image producing system 100. The stereoscopic image producing system 100 includes an apparatus for generating two pieces of image data having horizontal parallax by a producer 10, for example, a stereoscopic image capturing apparatus 102 for capturing images or a computer 104 for generating computer graphics (CGs), and a stereoscopic image display apparatus 106 for displaying images based on the generated image data. The image data produced by using the stereoscopic image producing system 100 may be provided to a viewer 12 through, for example, a screen 108 in a theater, and the viewer 12 may observe the provided images through polarized glasses or the like. In the embodiment, a person who produces the image data is referred to as the producer 10 and a person who observes image based on the image data is referred to as the viewer 12 for convenience of comprehension; however, the present embodiment is not limited by users, of course.

In the stereoscopic image producing system 100, an image forming location of a subject image in a perspective direction may be changed by adjusting parallax between two images of a subject. However, if the subject image is formed to excessively protrude or to excessively be recessed by having the parallax too large, the viewer 12 may feel fatigue. Thus, whenever image data is generated, the producer 10 displays an image based on the generated image data on the stereoscopic image display apparatus 106 in order to identify whether the size of parallax of a subject image is maintained within an appropriate range. If the size of the parallax is not in the appropriate range, the producer 10 may adjust the image data such that the size of the parallax may be included in the appropriate range.

In the present embodiment, the producer 10 can easily and accurately determine parallax between two images of a subject by using the stereoscopic image display apparatus 106, and thus the producer 10 can adjust image data to a desired display status by using the parallax, and the image data having a natural stereoscopic effect may be generated so that the viewer 12 may not feel fatigue.

(Stereoscopic Image Display Apparatus 106)

Figure 2:
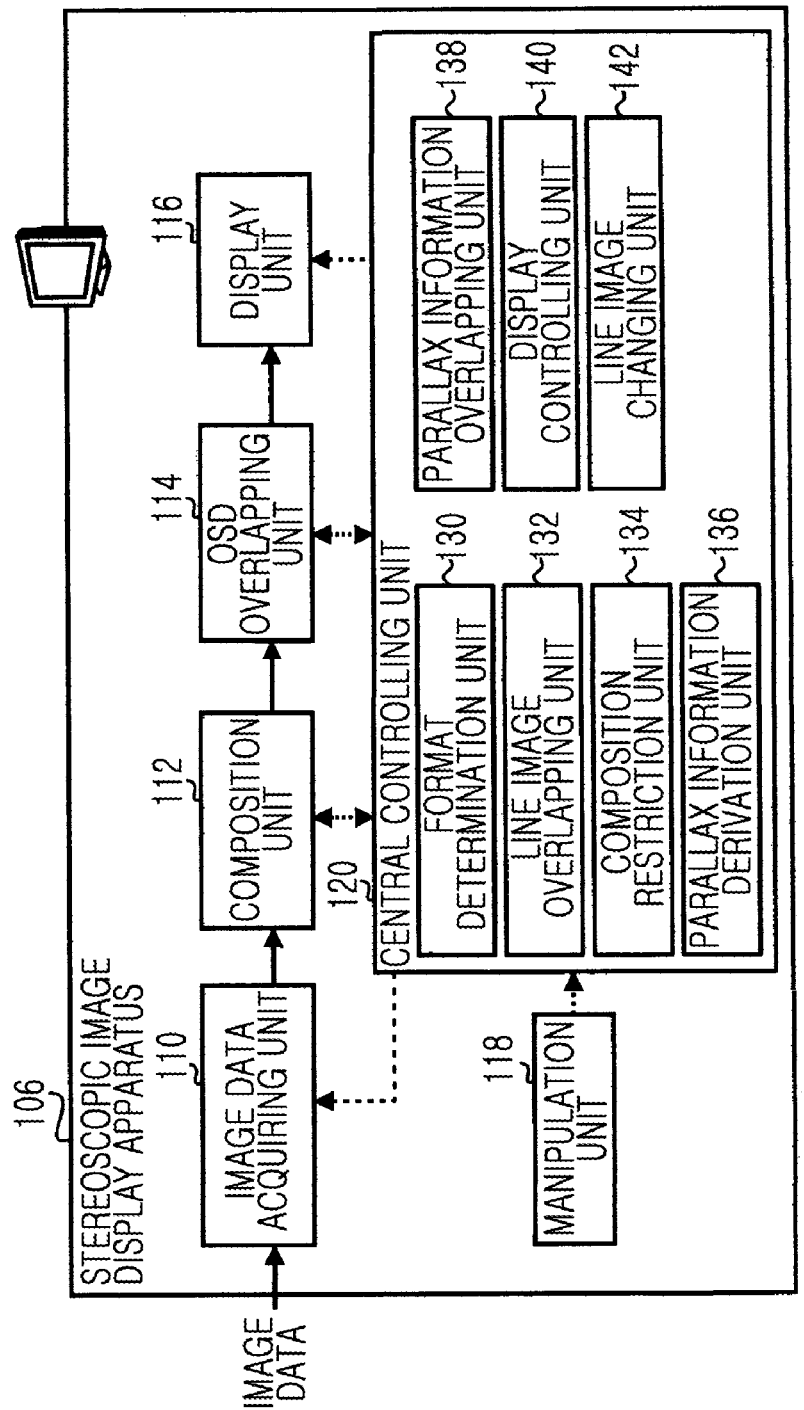
FIG. 2 is a functional block diagram schematically showing functions of a stereoscopic image display apparatus.

FIG. 2 is a functional block diagram schematically showing functions of the stereoscopic image display apparatus 106. As shown in FIG. 2, the stereoscopic image display apparatus 106 includes an image data acquiring unit 110, a composition unit 112, an on-screen display (OSD) overlapping unit 114, a display unit 116, a manipulation unit 118, and a central controlling unit 120. In FIG. 2, solid lines denote flow of data, and dotted lines denote flow of control signals.

The image data acquiring unit 110 acquires two pieces of image data, that is, left and right image data, having horizontal parallax (hereinafter, each of the two pieces of image data will be referred to as right eye image data and left eye image data in a case where there is a need to distinguish left and right image data from each other) via an image signal input terminal such as a high-definition multimedia interface (HDMI) terminal or the like, wherein the left and right image data are obtained from images captured at optical axes (viewpoints) different from each other, or images of CGs corresponding to images captured at different optical axes for sensing a stereoscopic image. Here, the left and right eye image data may be independently acquired, or may be acquired as integrated data.

Here, format types of the integrated data may include an LR independent type in which two pieces of image data are juxtaposed in left and right sides, a side-by-side type in which two pieces of image data are compressed to half horizontally and juxtaposed in left and right sides, an above-and-below type in which two pieces of image data are compressed to half in a vertical direction (perpendicular direction) and juxtaposed in up and down sides, a frame sequential type in which two pieces of image data are alternately disposed in a time sequential direction, or the like.

The composition unit 112 composes the left and right image data acquired by the image data acquiring unit 110 to generate display data. In more detail, the composition unit 112 firstly splits the two pieces of image data acquired by the image data acquiring unit 110 according to a control signal output from a format determination unit 130 that will be described later, and composes the split two pieces of image data according to a display type of the display unit 116. The display type may be a line-by-line type, a checkerboard type, an anaglyph type, or a color code 3D type, which is a passive type, a frame sequential type, which is an active type, or the like.

The line-by-line type is a method of disposing two kinds of polarization filters having polarization properties different from each other in alternate lines (every horizontal line) on a display surface of the display unit 116, and displaying right eye image on odd-numbered lines in which one kind of polarization filter is disposed, and left eye image on even-numbered lines in which other kind of polarization filter is disposed. The checkerboard type is a method of disposing two different kinds of polarization filters having different polarization properties on each of pixels, not lines. The anaglyph type is a method of creating right eye image and left eye image in different colors, for example, red and blue, and seeing the two images exclusively with a right eye and a left eye of the viewer 12 by using colored glasses in which red and blue color filters are applied. The color code 3D type is a method that improves reproducibility of colors by using blue and amber-based colors instead of the two colors used in the anaglyph method. The frame sequential type is a method of displaying right eye image and left eye image alternately on the display unit 116, and seeing the right eye image with only a right eye of the viewer 12 and the left eye image to only a left eye of the viewer 12 through an electronic shutter that is exclusively opened/closed.

Figure 3:
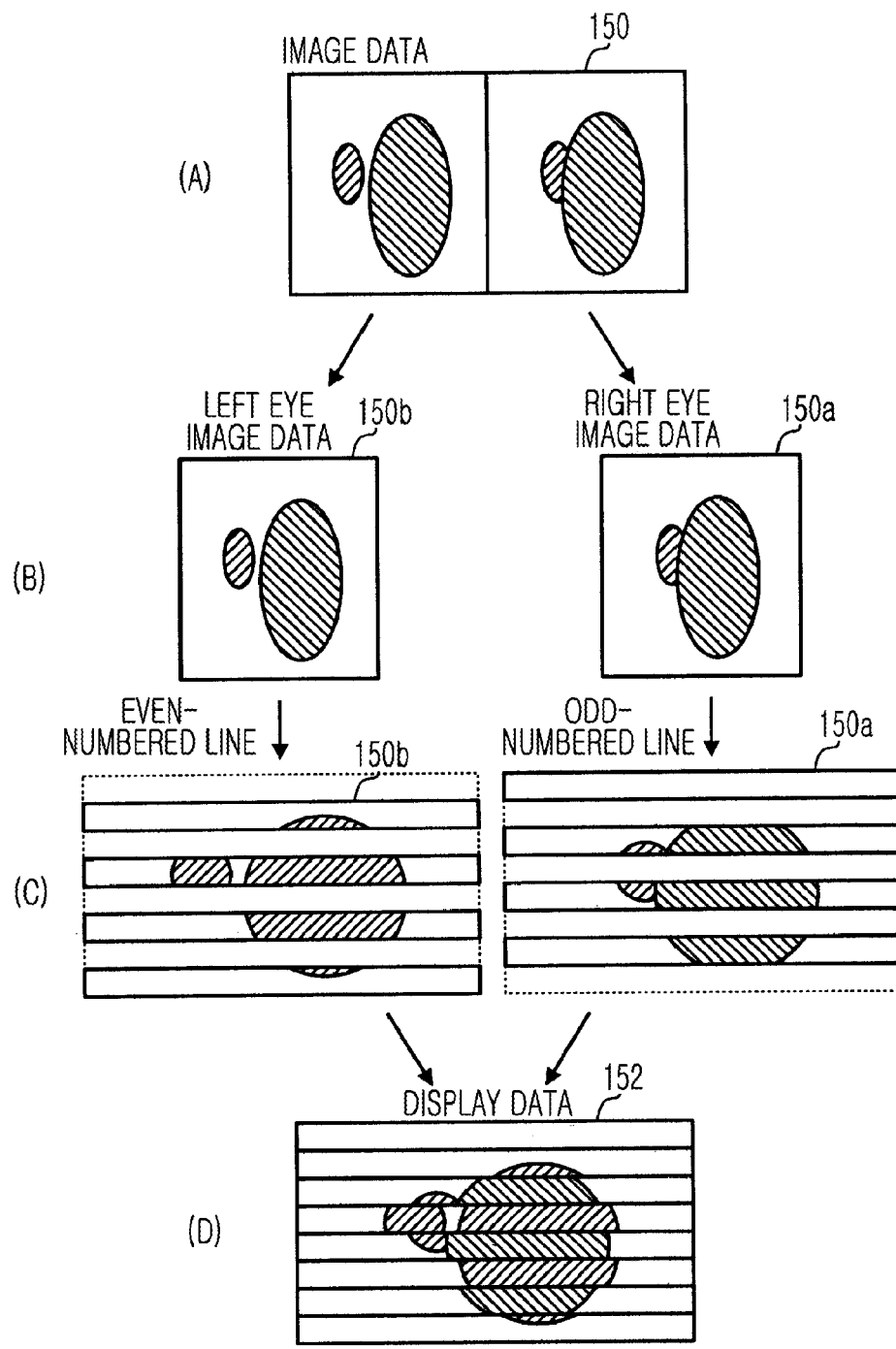
FIG. 3 is diagram for explaining operations of a composition unit.

FIGS. 3A through 3D are diagrams for explaining operations of the composition unit 112. For example, when the image data acquiring unit 110 acquires image data 150 of the side-by-side type, in which two pieces of image data are integrated as shown in FIG. 3A, the composition unit 112 firstly splits the image data 150 into right eye image data 150a and left eye image data 150b, as shown in FIG. 3B. Then, the composition unit 112 extracts image data of odd-numbered lines from the right eye image data 150a and extracts image data of even-numbered lines from the left eye image data 150b, and at the same time, magnifies the images to be twice in a horizontal direction and finally composes the odd-numbered lines of the right eye image data 150a and the even-numbered lines of the left eye image data 150b as shown in FIG. 3C to generate display data 152 of the line-by-line type as shown in FIG. 3D. Here, the total number of lines is eight for convenience of description; however, the actual number of lines is equal to the number of scanning lines (for example, 1080), and thus the display data 152 may be recognized as if images of a subject having parallax therebetween overlap each other when an image based on the display data 152 is observed with naked eyes.

The viewer 12 observes the image based on the display data 152 via polarized glasses in which two polarization filters having polarization properties different from each other are provided, and then sees only the right eye image data 150a with his/her right eye and sees only the left eye image data 150b with his/her left eye. Therefore, the viewer 12 may perceive a stereoscopic image by forming a subject image on a side protruding from the display unit 116 or a side recessed from the display unit 116.

Returning back to FIG. 2, the OSD overlapping unit 114 is formed of, for example, a character generator, and overlaps horizontal line images, longitudinal line images, parallax information transmitted from a line image overlapping unit 132 or a parallax information overlapping unit 138 that will be described later, or OSDs showing display states of the display unit 116, with the image based on the display data 152. In more detail, the OSD overlapping unit 114 receives locations on a screen (coordinates) corresponding to the horizontal line images, the longitudinal line images, and the parallax information and pixel data, from the line image overlapping unit 132 or the parallax information overlapping unit 138, and overlaps an image based on the pixel data with the image based on the display data 152 at the received corresponding locations.

The display unit 116 may include a liquid crystal display, an organic electro luminescence (EL) display, or the like, and displays the image based on the display data 152, in which the horizontal line images, the longitudinal line images, and the parallax information are overlapped with each other by the OSD overlapping unit 114, according to a control signal of a display controller 140 that will be described later. In addition, the display unit 116 may be set in various display modes in correspondence with display types of the display data 152. For example, if the image based on the display data 152 of the line-by-line type is to be displayed, the two kinds of polarization filters having polarization characteristics different from each other are alternately disposed (in every horizontal line) in the display unit 116. The viewer 12 may perceive the image based on the display data 152 of the line-by-line type displayed on the display unit 116 as a stereoscopic image, by observing the display unit 116, in which the polarization filters are arranged, through polarization glasses. Otherwise, if the image based on the display data 152 of the frame sequential type is to be displayed, the display unit 116 displays a right eye image based on the right eye image data 150a and a left eye image based on the left eye image data 150b alternately and time-divisionally at a period that is half a general period.

The manipulation unit 118 consists of a manipulation key including a power switch, a cross button, a joystick, a touch panel overlapping a display surface of the display unit 116, or the like to receive a manipulation input of the producer 10. In addition, when a remote controller for remote manipulation is provided, the remote controller also functions as the manipulation unit 118.

The central controlling unit 120 manages and controls all of the stereoscopic image display apparatus 106 by using a semiconductor integrated circuit including a central processing unit (CPU), a read only memory (ROM) in which a program or the like is accommodated, and a random access memory (RAM) as a work area. In addition, in the present embodiment, the central controlling unit 120 functions as the format determination unit 130, the line image overlapping unit 132, the composition restriction unit 134, a parallax information derivation unit 136, the parallax information overlapping unit 138, the display controller 140, and a line image changing unit 142.

The format determination unit 130 determines whether the two pieces of image data acquired by the image data acquiring unit 110 are acquired independently or as integrated data. In addition, when the format determination unit 130 determines that the two pieces of image data are acquired as integrated data, the format determination unit 130 also determines whether the format type of the image data is the LR independent type, the side-by-side type, the above-and-below type, or the frame sequential type, and outputs the determination result to the composition unit 112. The composition unit 112 recognizes the format type of the two pieces of image data according to the determination result, and splits the two pieces of image data based on the format type. Otherwise, the format determination unit 130 does not automatically determine the format type of the two pieces of image data acquired by the image data acquiring unit 110, but may output a format type selected by a manipulation input of the producer 10 (user) to the composition unit 112.

The line image overlapping unit 132 overlaps a horizontal line image extended in a horizontal direction and two longitudinal line images extended in a vertical direction with the image based on the display data 152 by using the OSD overlapping unit 114. In addition, the line image overlapping unit 132 independently moves the horizontal line image in the vertical direction and the two longitudinal line images in the horizontal direction, according to a manipulation input of the producer 10.

FIG. 4 is a diagram for explaining operations of the line image overlapping unit 132. Here, the parallax information derivation unit 136 derives parallax between right and left image data 150a and 150b of an arbitrary subject image 154 in the image based on the display data 152, according to a manipulation input of the producer 10. The line image overlapping unit 132 overlaps a horizontal line image 156 and longitudinal line images 158a and 158b at a predetermined initiating location in the image based on the display data 152, as shown in FIG. 4A. Next, the line image overlapping unit 132 moves the horizontal line image 156 in the vertical direction according to a manipulation input of the producer 10 and locates the horizontal line image on the subject image 154, where the parallax is desired to be derived, as shown in FIG. 4B.

Figure 4A:
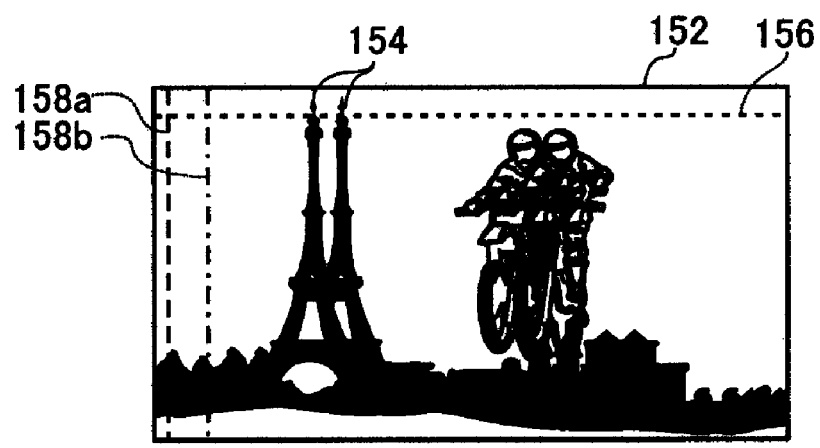
FIGS. 4A through 4D are diagrams for explaining operations of a line image overlapping unit.
Figure 4B:
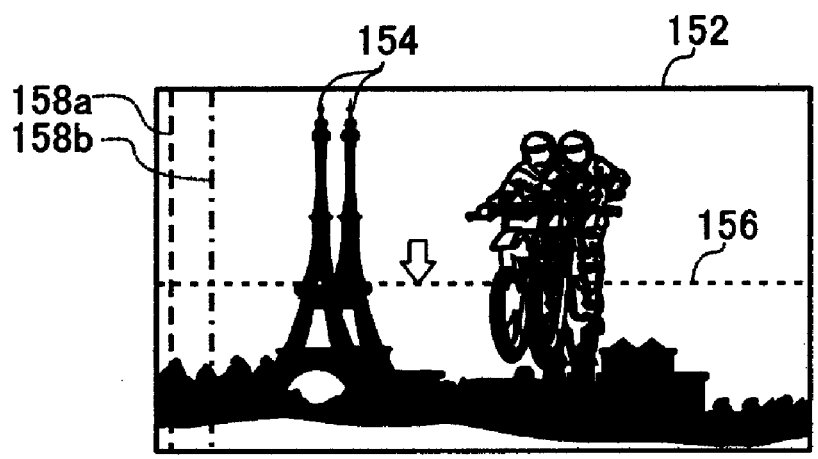
Figure 4C:
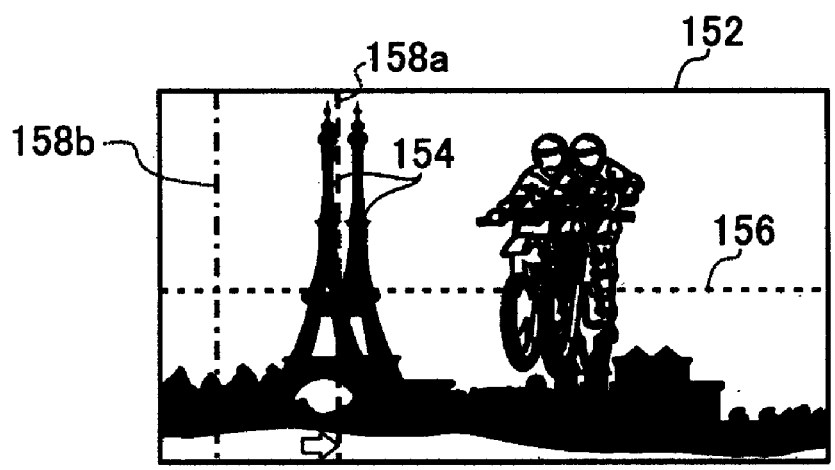
Figure 4D:
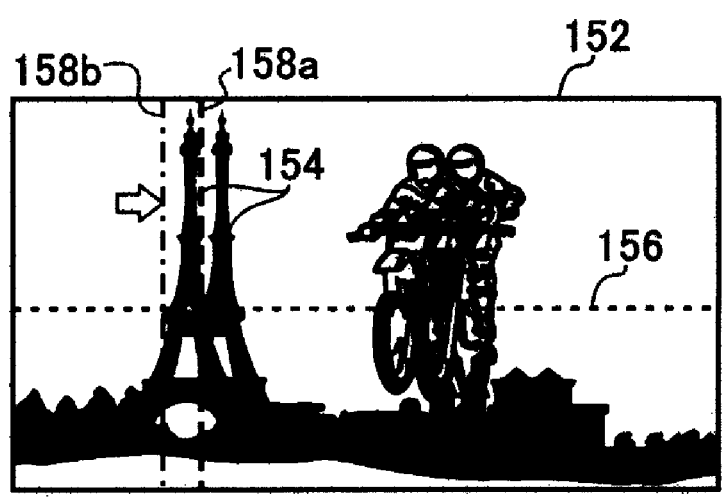

Then, the line image overlapping unit 132 moves one longitudinal line image 158a (right eye longitudinal line image) in the horizontal direction according to a manipulation input of the producer 10 and locates the one longitudinal line image on a portion of the subject image 154, where the parallax is desired to be derived (for example, edge) as shown in FIG. 4C. Last, the line image overlapping unit 132 moves the other longitudinal line image 158b (left eye longitudinal line image) in the horizontal direction according to a manipulation input of the producer 10 and locates the other longitudinal line image on a portion of the subject image 154, where the parallax is desired to be derived (for example, edge), different from the portion where the longitudinal line image 158a is located, as shown in FIG. 4D. As such, the longitudinal line image 158a at a side and the longitudinal line image 158b at the other side represent the same portion of the same subject image 154 respectively in the two pieces of image data 150a and 150b. Here, the line image overlapping unit 132 may display the horizontal line image 156, the longitudinal line image 158a, and the longitudinal line image 158b in display modes different from each other in order to distinguish each of the horizontal line image 156, the longitudinal line image 158a, and the longitudinal line image 158b from the others. For example, when the longitudinal line image 158a is displayed with a dashed line, the longitudinal line image 158b may be displayed with a dash-dot line. Otherwise, the horizontal line image 156, and the longitudinal line images 158a and 158b may be displayed in colors different from each other.

As described above, the longitudinal line images 158a and 158b are located at predetermined portions respectively in images based on the two pieces of image data 150a and 150b of the subject image 154, the parallax of which is to be derived, and thus the parallax may be determined electronically, not with naked eyes, and the parallax may be identified accurately. In addition, the line image overlapping unit 132 arranges the horizontal line image 156 that becomes a horizontal reference of the longitudinal line images 158a and 158b, at an appropriate location, before moving the longitudinal line images 158a and 158b. Therefore, the producer 10 may overlap both of the longitudinal line images 158a and 158b at a desired horizontal location easily and accurately, and thus the parallax can be derived more accurately.

However, as described above, the right eye image data 150a and the left eye image data 150b are arranged in alternate lines in the display data 152, and thus it is difficult to identify which of the right and left eye image data includes the subject image 154. Thus, in the present embodiment, operability of the longitudinal line images 158a and 158b are further improved by using the composition restriction unit 134.

The composition restriction unit 134 makes the composition unit 112 composes only image data corresponding to one of the longitudinal line images 158a and 158b that are overlapped by the line image overlapping unit 132, while moving the one of the longitudinal line images 158a and 158b. In more detail, the composition restriction unit 134 makes the composition unit 112 composes only the right eye image data 150a that corresponds to one longitudinal line image 158a while the one longitudinal line image 158a is moved, and does not display the left eye image data 150b (exclusion). The left eye image data 150b may not be displayed by, for example, composing pixels of a single color (for example, black pixels) instead of the left eye image data 150b at a time when the left eye image data 150b is composed.

FIG. 5 is a diagram for explaining operations of the composition restriction unit 134. As described above, the line image overlapping unit 132 overlaps the horizontal line image 156 and the longitudinal line images 158a and 158b with the image based on the display data 152. The line image overlapping unit 132 moves the horizontal line image 156 in the vertical direction according to a manipulation input of the producer 10 and locates the horizontal line image 156 on the subject image 154, in which the parallax is to be derived.

Figure 5A:
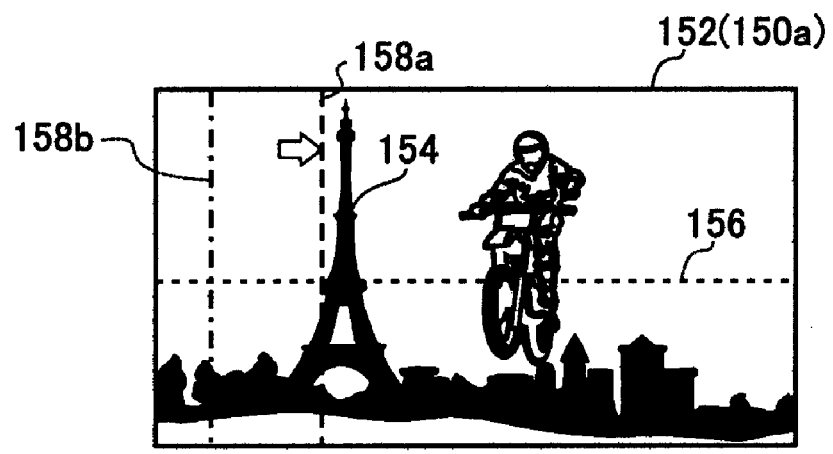
FIGS. 5A and 5B are diagrams for explaining operations of a composition restriction unit.

Here, it is assumed that the one longitudinal line image 158a that is to be moved corresponds to the right eye image data 150a between the two pieces of image data 150a and 150b of the display data 152, and the other longitudinal line image 158b corresponds to the left eye image data 150b. The composition restriction unit 134 makes the composition unit 112 compose only the right eye image data 150a corresponding to the one longitudinal line image 158a as shown in FIG. 5A, while the one longitudinal line image 158a is selected as a movable longitudinal line image. That is, through the composition unit 112 is originally provided to compose the right and left eye image data 150a and 150b, the composition restriction unit 112 restricts the composition operation of the composition unit 112 so as not to compose the left eye image data 150b. Therefore, the producer 10 may move the longitudinal line image 158a based on only the right eye image data 150a, and thus the longitudinal line image 158a may be located to an appropriate portion to calculate the parallax.

Figure 5B:
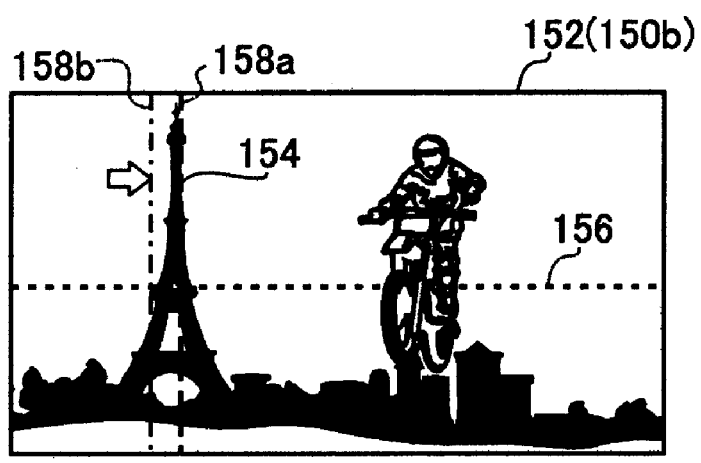

Next, while the line image overlapping unit 132 moves the other longitudinal line image 158b in the horizontal direction according to a manipulation input of the producer 10, the composition restriction unit 134 makes the composition unit 112 compose only the left eye image data 150b corresponding to the other longitudinal line image 158b as shown in FIG. 5B. Therefore, the producer 10 may move the other longitudinal line image 158b based on only the left eye image data 150b, and thus the other longitudinal line image 158b may be located to an appropriate portion to calculate the parallax, like the longitudinal line image 158a.

According to the configuration of the composition restriction unit 134, even when the right and left image data 150a and 150b are composed with each other and may not be distinguished from each other, one of the two pieces of the image data 150a and 150b may not be displayed temporarily while moving the longitudinal line image 158a or 158b, and the longitudinal line image 158a or 158b may be moved based on one piece of the image data. Thus, the producer 10 may move the longitudinal line image 158a or 158b to a desired location accurately and rapidly.

In addition, in a case where a certain pixel in the horizontal line image 156 includes an edge, the line image overlapping unit 132 detects the pixel including the edge while moving the longitudinal line images 158a and 158b, and moving velocities of the longitudinal line images 158a and 158b are slowed down at the location where the pixel including the edge is located such that the longitudinal line images 158a and 158b stay still for a short time. As such, an edge portion may be automatically defined without depending on fine-tuning of the producer 10.

Here, only one combination of the horizontal line image 156 and the longitudinal line images 158a and 158b is recited; however, the present invention is not limited to the above one combination. That is, the line image overlapping unit 132 may generate a plurality of combinations of the horizontal line image 156 and the longitudinal line images 158a and 158b and overlapping and moving of each of the combinations may be performed with respect to the image based on the display data 152. In this case, in order to distinguish each of the combinations from the others, the horizontal line image 156 and the longitudinal line images 158a and 158b may be displayed in different display modes, for example, in different color parties (red-based party, blue-based party, green-based party, etc.). As such, visibility of each of the combinations may be improved, and thus the producer 10 can continuously calculate a plurality of parallaxes of the subject images 154 with convenient operability.

Here, in a case where the format type of the display unit 116 is the frame sequential type, the composition restriction unit 134 arranges the image data corresponding to one longitudinal line image 158a in a sequence while moving the one longitudinal line image 158a between the two longitudinal line images 158a and 158b overlapped by the line image overlapping unit 132. Therefore, since the composition restriction unit 134 generally arranges the two image data 150a and 150b alternately in a period half the general period in a time serial direction according to the frame sequential type, the right eye image data 150a is only arranged in the general period and the left eye image data 150b is in an offset period while moving the one longitudinal line image 158.

The parallax information derivation unit 136 calculates (as numerical value) parallax between the longitudinal line images 158a and 158b located by the line image overlapping unit 132, and derives parallax information about the calculated parallax. The parallax information overlapping unit 138 additionally overlaps the derived parallax information with the image based on the display data 152, which overlaps with the horizontal line image 156, and the longitudinal line images 158a and 158b. The display controlling unit 140 displays the image based on the display data 152 that overlaps with the horizontal line image 156, the longitudinal line images 158a and 158b, and the parallax information, on the display unit 116. The parallax information may be the number of pixels corresponding to the parallax, or may be a ratio between the parallax between the longitudinal line images 158a and 158b and a display width in the horizontal direction when the image based on the display data 152 is displayed on the display unit 116.

Figure 6:
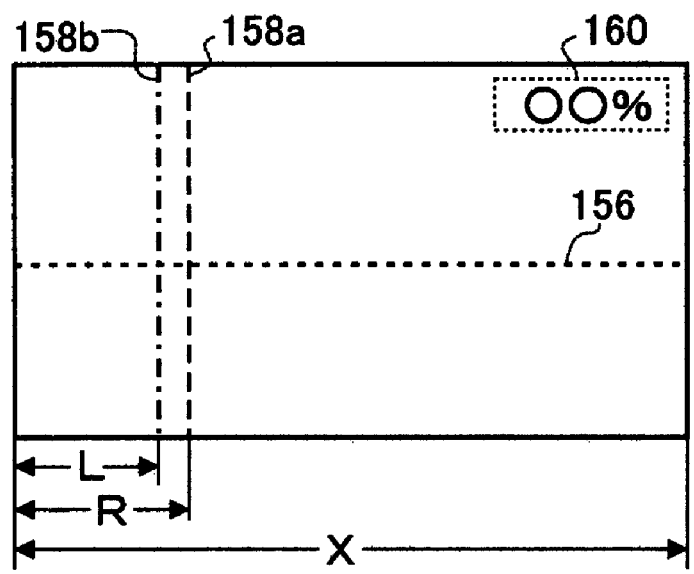
FIG. 6 is a diagram for explaining operations of a parallax information derivation unit.

FIG. 6 is a diagram for explaining operations of the parallax information derivation unit 136. Here, for convenience of description, the display data 152 is omitted, and the horizontal line image 156, the longitudinal line images 158a and 158b, and the parallax information 160 that overlap with the image based on the display data 152 are shown. The parallax $|\Delta x|$ can be derived from an equation $|\Delta x|=|L-R|$, where R is a distance from a left edge of the screen to the longitudinal line image 158a in the horizontal direction and L is a distance from the left edge of the screen to the longitudinal line image 158b in the horizontal direction. In addition, the ratio $\Delta xr$ between the parallax between the longitudinal line images 158a and 158b and the display width can be derived from an equation $\Delta xr=|\Delta x|/X\times 100(\%)$, where X denotes the display width. The parallax information overlapping unit 138 overlaps derived parallax information 160, that is, the parallax $|\Delta x|$ or the ratio $\Delta xr$, with a portion avoiding display locations of the horizontal line image 156 and the longitudinal line images 158a and 158b. Here, even when sizes of the display screens in the stereoscopic image display apparatus 106 and the large-sized screen 108 are different from each other, the ratio $\Delta xr$ is in proportion to the number of pixels if resolutions of the display data 152 are the same as each other, and thus the parallax $|\Delta x|$ may be represented in the number of pixels.

The producer 10 may obtain the parallax easily, accurately, and quantitatively with reference to the numerical parallax information 160. Therefore, the producer 10 may predict degree of stereoscopic effect when the image data 150 is displayed on a screen, for example, the large-sized screen 108.

In addition, the parallax information derivation unit 136 derives the parallax information 160 which defines relative location (parallax direction (sign of $\Delta x$)) of the longitudinal line images 158a and 158b in the horizontal direction in addition to the parallax $|\Delta x|$ between the longitudinal line images 158a and 158b, and the parallax information overlapping unit 138 may overlap the relative location in the horizontal direction with the image based on the display data 152. Hereinafter, the relative location in the horizontal direction will be described as follows.

FIGS. 7A through 7C and FIG. 8 are diagrams for explaining relative location of the parallax in the horizontal direction. Here, FIGS. 7A and 7C are views seen from an upper surface, and FIG. 7A shows a relative location of a subject 174 during an imaging operation and FIG. 7C shows an image forming location during observing the image. As shown in FIG. 7A, in left and right image data 150a and 150b captured by the stereoscopic image capturing apparatus 102 accompanied with an angle of convergence, the subject image 154 generates parallax according to a location of the subject in a perspective direction as described above. Relative locations shown in the left and right image data 150a and 150b vary depending on the location of the subject 174 (174a, 174b, or 174c in FIG. 7A through 7C) in the perspective direction.

For example, with respect to a subject image 154a of the subject 174a located at a convergence point 172 (a point (perspective location) where the display surface of the display unit 116 is located during the displaying operation), there is no parallax between the left and right image data 150a and 150b as shown in FIG. 7B ($\Delta x=0$). However, in a case of a subject image 154b of the subject 174b that is located closer to the stereoscopic image capturing apparatus 102 than the convergence point 172 is, an appearing location of the subject image 154b denoted by a dashed line in the right eye image data 150a is shifted from an appearing location of the subject image 154b denoted by a dash-dot line in the left eye image data 150b to a left side of the screen as shown in FIG. 7B ($\Delta x>0$). In addition, in a case of a subject image 154c of the subject 174c that is located at an opposite side of the stereoscopic image capturing apparatus 102 based on the convergence point 172, an appearing location of the subject image 154c in the right eye image data 150a is shifted from an appearing location of subject image 154c in the left eye image data 150b to a right side of the screen as shown in FIG. 7B ($\Delta x<0$).

When the image based on the left and right image data 150a and 150b is displayed on the stereoscopic image display apparatus 106, the subject image 154a is formed at the perspective location of the stereoscopic image display apparatus 106, the subject image 154b is formed to protrude toward the producer 10 from the stereoscopic image display apparatus 106, and the subject image 154c is formed to be recessed toward a side opposite of the producer 10 from the stereoscopic image display apparatus 106 as shown in FIG. 7C, with respect to the producer 10 wearing polarized glasses for perceiving a stereoscopic image. In the present embodiment, the parallax information derivation unit 136 defines the relative locations of the longitudinal line images 158a and 158b in the horizontal direction, that is, whether the longitudinal line image 158a corresponding to the right eye image data is located on left or right side of the longitudinal line image 158b corresponding to the left eye image data, such that the producer 10 may identify the location where the subject image 154 is formed.

In more detail, when the longitudinal line image 158a is located at a left side of the longitudinal line image 158b, that is, when a parallax vector including a parallax direction is greater than 0 ($\Delta x=L-R>0$) in FIG. 6, the subject image 154 is perceived as if it protrudes and the parallax information derivation unit 136 adds a sign (+) representing the protrusion to the parallax information 160 or does not add any sign. If the longitudinal line image 158a is located at a right side of the longitudinal line image 158b, that is, if the parallax vector is less than 0 ($\Delta x=L-R<0$) in FIG. 6, the subject image 154 is perceived as if it is recessed and the parallax information derivation unit 136 adds a sign (−) representing the recessed state to the parallax information 160. In a case of the parallax vector is equal to 0 ($\Delta x=0$), no sign is added or a sign (+) may be added. In addition, the parallax information overlapping unit 138 overlaps the sign representing the relative location in the horizontal direction with the image based on the display data 152.

Figure 8A:
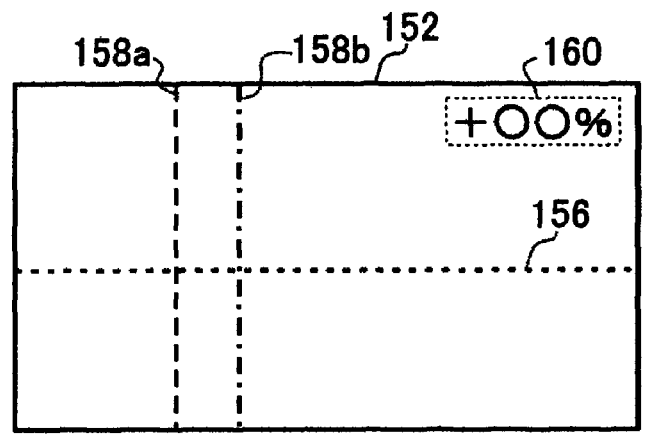
FIGS. 8A and 8B are diagrams for explaining relative locations of parallax in a horizontal direction.
Figure 8B:
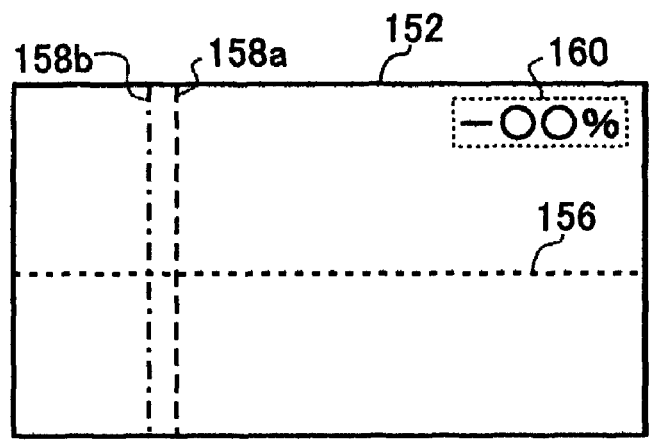

Therefore, with respect to the subject image 154b of FIG. 7B, in which the longitudinal line image 158a is located at the left side of the longitudinal line image 158b, the parallax information 160 including the sign (+) overlaps with the image based on the display data 152 as shown in FIG. 8A. In addition, with respect to the subject image 154c of FIG. 7B, in which the longitudinal line image 158a is located at the right side of the longitudinal line image 158b, the parallax information 160 including the sign (−) overlaps with the image based on the display data 152 as shown in FIG. 8B. Through the above configuration, the producer 10 may easily identify whether the subject image 154, the parallax of which is to be derived, is formed to protrude or to be recessed only by checking the sign, without wearing polarized glasses or the like. In addition, as described above, each of the longitudinal line images 158a and 158b corresponds to the image data and only moves based on the corresponding image data, and thus the producer 10 may identify the perspective location of the subject image 154 with high reliability without misunderstanding the subject image 154 on which the longitudinal line images 158a and 158b are to be located.

In addition, the parallax information 160 may be a ratio of a distance between the display unit 116 and a location where the subject image 154 having parallax between the longitudinal line images 158a and 158b is formed with respect to a distance between the display unit 116 and the viewer 12.

When it is assumed that an average distance between eyes of a human being is $\Delta k$ and the distance between the producer 10 and the display unit 116 is d, a distance $\Delta d$ from the display unit 116 to a location where the subject image 154 having the parallax between the longitudinal line images 158a and 158b is formed is calculated from an equation $\Delta d=\Delta x \times d/(\Delta x+\Delta k)$ by using the parallax vector $\Delta x$. Therefore, a ratio of the distance $\Delta d$ between the display unit 116 and the location where the subject image 154 having the parallax between the longitudinal line images 158a and 158b is formed with respect to the distance d between the display unit 116 and the viewer 12 ($\Delta d/d$) may be represented as $\Delta x/(\Delta x+\Delta k)$. By using the ratio, the producer 10 may easily assume the expected degree of stereoscopic effect.

As described above, the parallax information derivation unit 136 and the parallax information overlapping unit 138 derives the parallax information 160 and overlaps the derived parallax information 160 with the image based on the display data 152. However, there is no limitation on the time when the derivation and the overlapping are performed, and after operating the line image overlapping unit 132, that is, during the movement of the horizontal line image 156 or the longitudinal line images 158a and 158b, the parallax information 160 may be derived at any time according to the location of the horizontal line image 156 or the longitudinal line images 158a and 158b and may be overlapped with the image based on the display data 152.

However, as described above, if the subject image 154 is formed to be excessively protruded or excessively recessed, the viewer 12 may feel fatigue. The producer 10 displays the generated image data 150 immediately, and identifies whether the parallax between the two pieces of image data 150a and 150b of the arbitrary subject image 154 included in the image data 150 is included in an appropriate perspective distance. Then, if the parallax is not in the appropriate perspective distance, an image capturing status may be adjusted. Thus, in the present embodiment, the line image changing unit 142 is provided such that the producer 10 may intuitively and rapidly determine whether the image data 150 is generated appropriately in a desired state.

If the parallax between the longitudinal line images 158a and 158b is greater than a predetermined threshold value, that is, the parallax vector $\Delta x$ including the relative locations between the two pieces of image data 150a and 150b of the subject image 154 is equal to or greater than a first threshold value ($\Delta x>0$ and parallax $|\Delta x| \geq |$first threshold value$|$) or less than a second threshold value ($\Delta x<0$ and parallax $|\Delta x| \leq |$second threshold value$|$), the line image changing unit 142 changes display states of the longitudinal line images 158a and 158b into display states that may notify that the parallax exceeds the threshold value. Here, the first threshold value may be, for example, +20% of the display width of the display data 152, and the second threshold value may be, for example, −2% of the display width of the display data 152.

In more detail, the line image changing unit 142 may change line type, line width, or color of the longitudinal line images 158*a* and 158*b*, may make the longitudinal line images 158*a* and 158*b* flicker, or add an index of alarm, for example, "!" or the like, around the longitudinal line images 158*a* and 158*b*. Here, if the subject image 154 that is an image of an object from which the parallax between the longitudinal line images 158*a* and 158*b* is to be derived can be defined (for example, the subject image 154 to which both the longitudinal line images 158*a* and 158*b* contact), a display state of the subject image 154 itself may be changed.

Through the above configuration, even though the producer 10 does not determine whether the numerical value exceeds the threshold value, wherein the numerical value is to numerically turn the parallax information obtained by the parallax information derivation unit 136, the producer 10 can intuitively or rapidly identify that the parallax is appropriately generated in the desired state from the fact that the display state is not changed. Therefore, the producer 10 may easily produce the image data 150 with the desired display state such that the viewer 12 may sense a natural stereoscopic image without feeling any fatigue. As such, the producer 10 may provide the viewer 12 with the corresponding image data 150.

As described above, in the stereoscopic image display apparatus 106, the line-by-line type and the frame sequential type are described as examples of the format type of the display unit 116; however, the format type is not limited thereto, and the present embodiment may be applied to the checker board type, the anaglyph type, the color code 3D type, and the like. In addition, the two pieces of image data 150*a* and 150*b* are displayed on the display unit 116 that is not performed a process for perceiving a stereoscopic image as they are without separating the two pieces of image data 150*a* and 150*b* according to the side-by-side type, the above-and-below type, or the like, the horizontal line image 156 overlaps with the two pieces of image data 150*a* and 150*b* by operating the horizontal line image 156. Also, the one longitudinal line image 158*a* overlaps with the image based on the image data 152 and the other longitudinal line image 158*b* overlaps with the image based on the image data 152. Then, the producer 10 may easily and accurately obtain the parallax of the subject image 154 in the display data 152.

The composition unit 112 or the OSD overlapping unit 114 is configured as hardware in the above described stereoscopic image display unit 106; however, the invention is not limited thereto. That is, all image processes may be executed in software stored in the central controlling unit 120, and the image based on the final display data 152, in which the horizontal line image 156, the longitudinal line images 158*a* and 158*b*, and the parallax information 160 are overlapped, may be displayed on the display unit 116.

(Stereoscopic Image Display Method)

Figure 9:
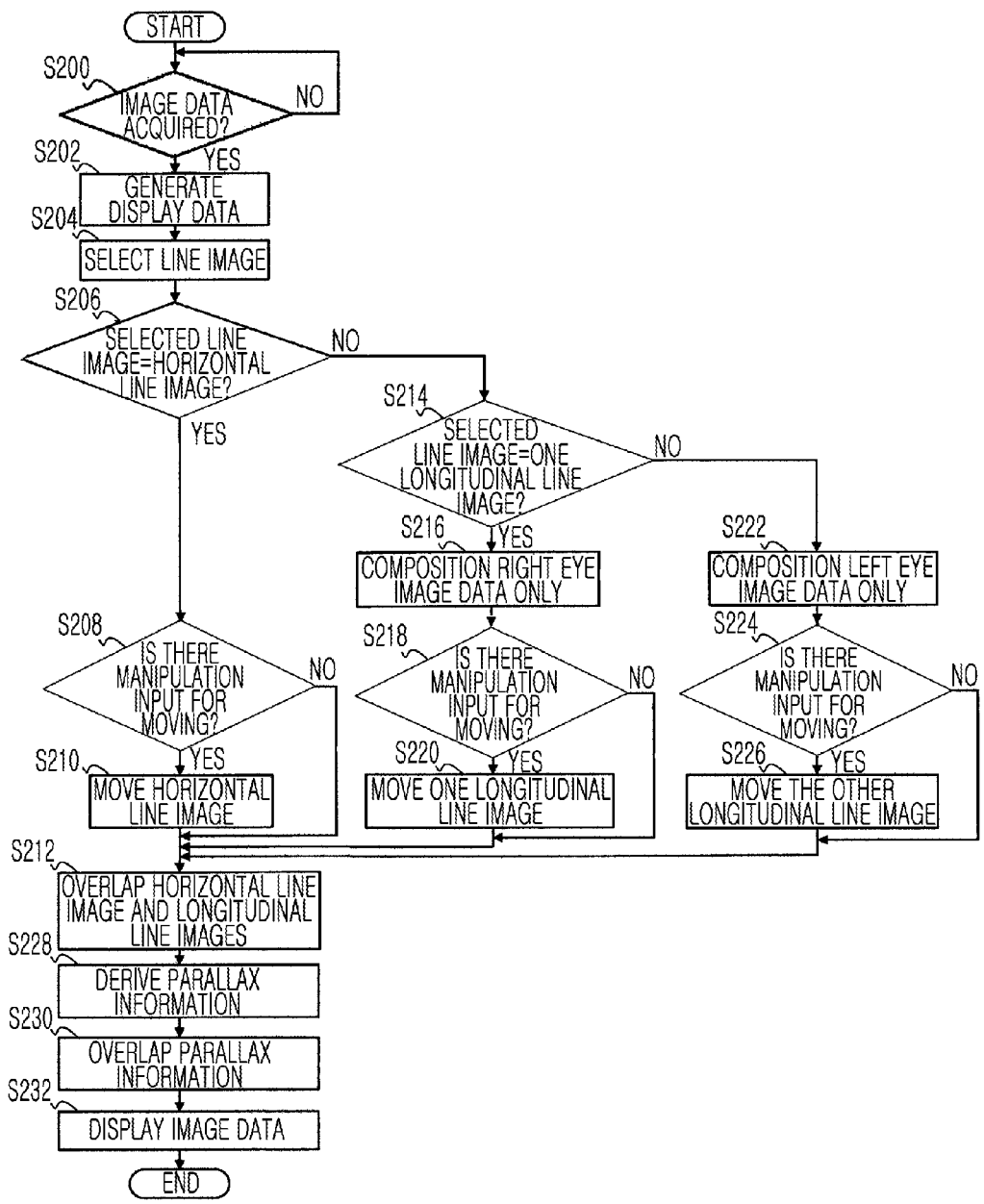
FIG. 9 is a flowchart for explaining a flow of processes in a stereoscopic image display method.

A stereoscopic image display method using the stereoscopic image display apparatus 106 is provided. FIG. 9 is a flowchart for explaining a flow of processes in the stereoscopic image display method.

When the image data acquiring unit 110 of the stereoscopic image display apparatus 106 acquires two pieces of image data 150*a* and 150*b* having parallax (YES in the operation S200), the composition unit 112 composes the two pieces of image data 150*a* and 150*b* to generate display data (S202). The line image overlapping unit 132 selects a line image to be moved among the horizontal line image 156 and the longitudinal line images 158*a* and 158*b* according to a manipulation input of the producer 10 (S204).

When the selected line image is the horizontal line image 156 (YES in the operation S206), the line image overlapping unit 132 determines whether there is a manipulation input of the producer 10 for moving the horizontal line image 156 in a vertical direction based on the input from the manipulation unit 118 (S208). When there is the manipulation input of the producer 10 (YES in the operation S208), the horizontal line image 156 to be overlapped is moved by a predetermined distance in the vertical direction according to the manipulation input (S210). When there is no manipulation input from the producer 10 (NO in the operation S208), a previous location of the horizontal line image 156 is maintained by not performing any process with respect to the horizontal line image 156 that is to be overlapped. The line image overlapping unit 132 overlaps the longitudinal line images 158*a* and 158*b*, in which previous locations are maintained, and the horizontal line image 156, in which an overlapping position is determined as above, with the image based on the display data 152 (S212). The present stereoscopic image display method is repeatedly performed whenever the two pieces of image data 150*a* and 150*b* are acquired (YES in the operation S200), and thus the producer 10 continuously performs the manipulation input for moving the horizontal line image 156 in the vertical direction for a predetermined time to move the horizontal line image 156 to a desired location.

If the selected line image is not the horizontal line image 156 (NO in the operation S206) but one of the longitudinal line images 158*a* and 158*b* (YES in the operation S214), the line image overlapping unit 132 makes the composition unit 112 compose only the right eye image data 150*a* corresponding to the longitudinal line image 158*a* (S216). In addition, the line image overlapping unit 132 determines whether there is a manipulation input of the producer 10 for moving the longitudinal line image 158*a* (S218). When there is the manipulation input from the producer 10 (YES in the operation S218), the longitudinal line image 158*a* that is to be overlapped is moved by a predetermined distance in the horizontal direction according to the manipulation input of the producer 10 (S220). If there is no manipulation input of the producer 10 (NO in the operation S218), no process is performed with respect to the longitudinal line image 158*a* that is to be overlapped so as to maintain the previous location of the longitudinal line image 158*a*. The line image overlapping unit 132 overlaps the horizontal line image 156 and the longitudinal line image 158*b*, in which the previous locations are maintained, and the longitudinal line image 158*a*, in which an overlapping location is determined as above, with the image based on the display data 152 (S212). As described above, the present stereoscopic image display method is repeatedly performed whenever the two pieces of image data 150*a* and 150*b* are acquired (YES in the operation S200), and thus the producer 10 continuously perform the manipulation input for moving the longitudinal line image 158*a* in the horizontal direction for a predetermined time so as to move the longitudinal line image 158*a* to a desired location.

Otherwise, if the selected line image is not the horizontal line image 156 and the longitudinal line image 158*a* (NO in the operations S206 and S214) but the longitudinal line image 158*b*, the line image overlapping unit 132 makes the composition unit 112 compose only the left eye image data 150*b* corresponding to the longitudinal line image 158*b* (S222). In addition, the line image overlapping unit 132 determines whether there is a manipulation input of the producer 10 for moving the longitudinal line image 158*b* in the horizontal direction (S224). If there is the manipulation input from the producer 10 (YES in the operation S224), the longitudinal line image 158b that is to be overlapped is moved by a predetermined distance in the horizontal direction according to the manipulation input of the producer 10 (S226). If there is no manipulation input from the producer 10 (NO in the operation S224), no process is performed with respect to the longitudinal line image 158b that is to be overlapped so as to maintain the previous location of the longitudinal line image 158b. The line image overlapping unit 132 overlaps the horizontal line image 156 and the longitudinal line image 158a, in which the previous locations are maintained, and the longitudinal line image 158b, in which an overlapping location is determined as above, with the image based on the display data 152 (S212). Here, the producer 10 continuously perform the manipulation input for moving the longitudinal line image 158b in the horizontal direction for a predetermined time so as to move the longitudinal line image 158b to a desired location.

When the horizontal line image 156 and the longitudinal line images 158a and 158b are overlapped with the image based on the display data 152 by the line image overlapping unit 132 (S212), the parallax information derivation unit 136 derives the parallax information 160 on the parallax between the longitudinal line images 158a and 158b (S228). The parallax information overlapping unit 138 additionally overlaps the derived parallax information 160 with the image based on the display data 152, in which the horizontal line image 156 and the longitudinal line images 158a and 158b are overlapped (S230). The display unit 116 displays the image based on the display data 152, in which the horizontal line image 156, the longitudinal line images 158a and 158b, and the parallax information 160 are overlapped (S232). Here, each of the line images is repeatedly moved according to a manipulation input of the producer 10 whenever the two pieces of image data 150a and 150a are acquired, and the producer 10 may see the parallax information 160 via the display data 152. Here, the manipulation input of the producer 10 is performed at the time when the image data 150 is acquired; however, the present embodiment is not limited thereto, that is, the manipulation input of the producer 10 can be performed by interrupt processing and such a manipulation input can be reflected in the movement of each of the line images.

As described above, according to the stereoscopic image display method using the stereoscopic image display apparatus 106, the producer 10 may easily and accurately grasp the parallax of the subject image 154 in the display data 152.

(Stereoscopic Image Capturing Apparatus 102)

In the previous embodiment, the stereoscopic image display apparatus 106 displays the image data 150 acquired by the image data acquiring unit 110 on the display unit 116 as the display data 152 (image based on the display data 152), and the producer 10 identifies the display of the display unit 116. Here, the stereoscopic image capturing apparatus 102 generating the image data 150 includes functions of the stereoscopic image display apparatus 106, and thus the image data 150 can be completely identified by using only the stereoscopic image capturing apparatus 102.

Figure 10:
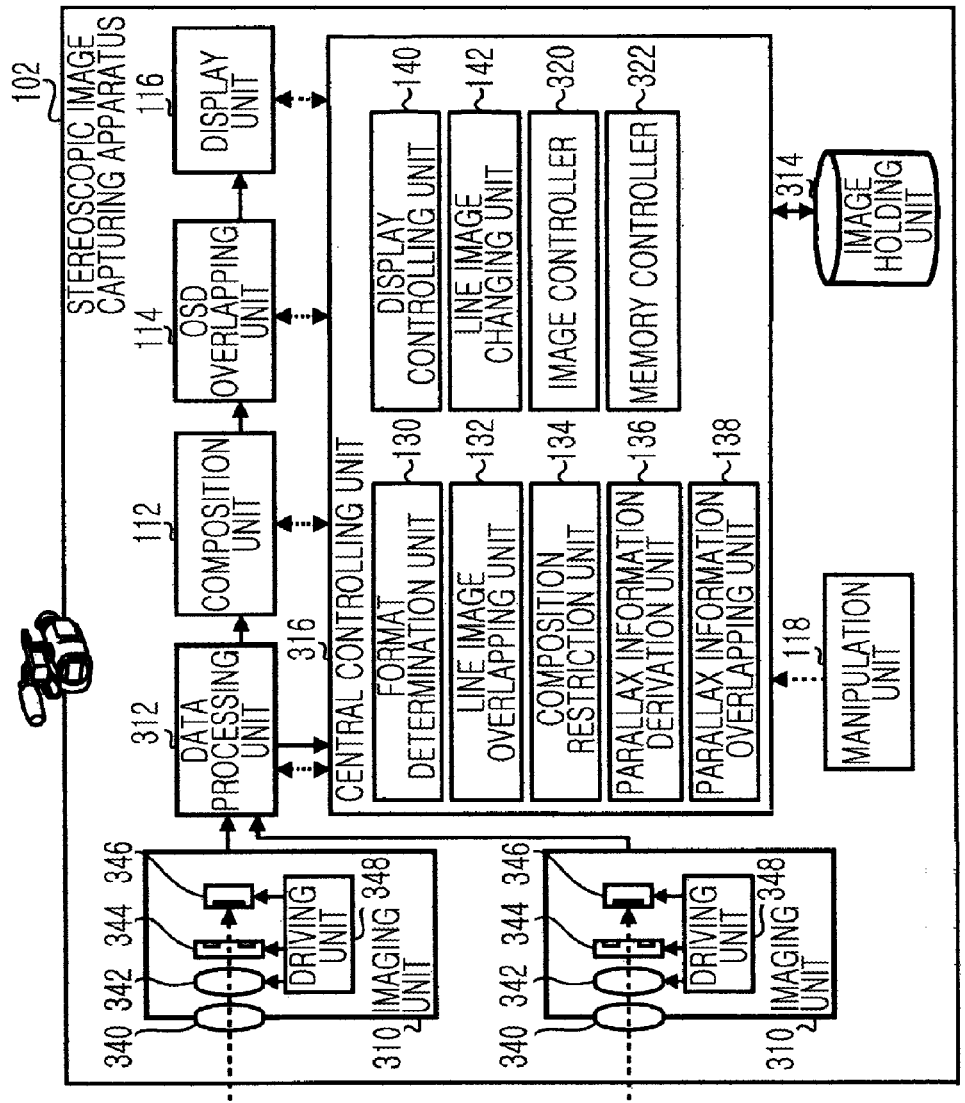
FIG. 10 is a functional block diagram schematically showing functions of a stereoscopic image capturing apparatus.

FIG. 10 is a functional block diagram schematically showing the stereoscopic image capturing apparatus 102. As shown in FIG. 10, the stereoscopic image capturing apparatus 102 includes two imaging units 310, a data processing unit 312, the composition unit 112, the OSD overlapping unit 114, the display unit 116, the manipulation unit 118, an image holding unit 314, and a central processing unit 316. The central processing unit 316 may function as the format determination unit 130, the line image overlapping unit 132, the composition restriction unit 134, the parallax information derivation unit 136, the parallax information overlapping unit 138, the display controlling unit 140, the line image changing unit 142, an imaging controller 320, and a memory controller 322. The composition unit 112, the OSD overlapping unit 114, the display unit 116, the format determination unit 130, the line image overlapping unit 132, the composition restriction unit 134, the parallax information derivation unit 136, the parallax information overlapping unit 138, the display controlling unit 140, and the line image changing unit 142 that are described in the previous embodiment have substantially the same functions as those of the present embodiment, and thus descriptions of the above components are not provided here. Here, the imaging units 310, the data processing unit 312, the image holding unit 314, the imaging controller 320, and the memory controller 322 will be described.

Each of the imaging units 310 includes an imaging lens 340, a focus lens 342 used to adjust focus, an iris 344 used to adjust exposure, an imaging device 346 for photoelectrically converting flux incident through the imaging lens 340 into electric data (image data), and a driving unit 348 for respectively driving the focus lens 342, the iris 344, and the imaging device 346 according to a control signal of the imaging controller 320 that will be described later. The imaging units 310 generate two pieces of image data 150a and 150b obtained by two optical axes that are arranged to be nearly parallel with each other or cross each other in an imaging direction.

The data processing unit 312 performs an image signal process, such as an R (Red) G (Green) B (Blue) process (γ correction or color correction), an enhance process, a noise reduction process, or the like, with respect to the image data received from the imaging unit 310 and outputs the processed image data 150 to the composition unit 112. The image data 150 becomes the display data 152 through the composition unit 112 or the OSD overlapping unit 114, and the display data 152 is displayed on the display unit 116 having a relatively small size such as a view finder or the like. The producer 10 performs a manipulation operation through the manipulation unit 118 while seeing the image displayed on the display unit 116 so as to identify the subject image having a desired location and a desired occupying area.

The image holding unit 314 is formed of a hard disk drive (HDD), a flash memory, a non-volatile RAM, or the like, and holds the image data 150 transmitted from the control processing unit 316 according to a control signal of the memory controller 322 that will be described later. The image holding unit 314 may be formed of a device for holding the image data in a recording medium that may be detachable such as an optical disc medium such as a compact disc (CD), a digital versatile disc (DVD), or a Blue-ray disc (BD), a portable memory card, or the like. Here, the image data 150 may be encoded in a predetermined encoding method such as a motion joint photographic experts group (M-JPEG), a moving picture experts group (MPEG)-2, or H.264.

The imaging controller 320 included in the central controlling unit 316 controls the imaging units 310 according to a manipulation input of the producer 10. For example, the imaging controller 320 controls the driving unit 348 to drive the focus lens 342, the iris 344, and the imaging device 346 to appropriately obtain the image data 150.

The memory controller 322 stores the image data 150 transmitted from the data processing unit 312 in the image holding unit 314 while the producer 10 generates the image data 150.

Due to demands for small-sized and light-weight stereoscopic image capturing apparatus 102, the display unit 116 is intended to be reduced. Therefore, it is difficult to grasp the parallax between the two pieces of image data 150a and 150b on the display unit 116. In the present embodiment, the parallax may be derived accurately by using the line image overlapping unit 132 or the parallax information overlapping unit 138 even in the stereoscopic image capturing apparatus 102. The producer 10 may rapidly and intuitively determine whether the parallax is within an appropriate perspective distance by using the line image changing unit 142, and thus a natural stereoscopic image may be perceived by the viewer 12 through an adjustment process of a distance between the imaging units 310, or the like, without feeling any fatigue to eyes of the viewer 12. As such, the producer 10 may provides the viewer 12 with the corresponding image data 150 without anxiety.

In the present embodiment, the stereoscopic image capturing apparatus 102 generates the image data 150 by using the two imaging units 310 (twin lens camera) as an example; however, a stereoscopic image capturing adaptor that captures one subject simultaneously from two view points by using an optical unit such as a mirror may be located in a front portion of an optical path of one imaging unit 310 such that two pieces of image data may be integrally acquired as a piece of image data.

Also, a stereoscopic image display program or a stereoscopic image capturing program for operating a computer as the stereoscopic image display apparatus 106 or the stereoscopic image capturing apparatus 102, or a computer readable recording medium such as a flexible disc, a magneto-optical disc, a ROM, an erasable programmable ROM (EPROM), an electrically EPROM (EEPROM), a compact disc (CD), a digital versatile disc (DVD), or a Blu-ray disc (BD) having thereon the stereoscopic image display program or the stereoscopic image capturing program is also provided. Here, the programs refer to a data processing unit that is written in an arbitrary language or in a writing method.

The present invention has been particularly shown and described with reference to exemplary embodiments thereof, but is not limited thereto. It will be understood by those skilled in the art that various changes in form and details may be made therein without departing from the spirit and scope of the invention as defined by the appended claims.

For example, in the previous embodiments, each of the functional units is provided in a group of the stereoscopic image display apparatus 106; however, the functional units may be realized as additional apparatuses that are combined to achieve the objective of the present invention. For example, the split or composition of the image data 150 performed by the composition unit 112 may be realized by using an additional 3D converter, or functions of the line image overlapping unit 132 may be performed by using an additional projector. Also, the composition restriction unit 134 restricts the composition of the image data 150 in synchronization with the projector, that is, the right eye image data 150a may be only composed when the longitudinal line image 158a is projected through the projector and the left eye image data 150b may be only composed when the longitudinal line image 158b is projected through the projector.

In addition, each of the processes in the stereoscopic image display method is not necessarily performed in a time-serial manner according to the order stated in the flowcharts; the processes may be performed in a parallel manner or may include sub-routines.

According to the present invention, a producer of image data may easily and accurately identify parallax of each of subject images in display data, and the producer may adjust the image data to a desired display state. Therefore, according to the present invention, image data in which a viewer is able to perceive a natural stereoscopic image without any fatigue to eyes of a viewer may be generated.

INDUSTRIAL APPLICABILITY

The present invention may be used in a stereoscopic image display apparatus, a stereoscopic image capturing apparatus, and a stereoscopic image display apparatus for displaying images based on display data for making a viewer perceive a stereoscopic image.

What is claimed is:
1. A stereoscopic image display apparatus comprising:
an image data acquiring unit which acquires right eye image data and left eye image data having horizontal parallax;
a composition unit which generates display data by composing the the right eye image data and the left eye image data;
a line image overlapping unit which overlaps two longitudinal line images, which are right eye longitudinal line image and left eye longitudinal line image, extending in a vertical direction with an image based on the display data, and independently moves the right eye longitudinal line image and the left eye longitudinal line image in a horizontal direction according to a manipulation input of a user;
a parallax information derivation unit which derives parallax information on parallax between the right eye longitudinal line image and the left eye longitudinal line image;
a parallax information overlapping unit which additionally overlaps the parallax information with the image based on the display data, on which the right eye longitudinal line image and the left eye longitudinal line image are overlapped;
a display unit which displays the images based on the display data, on which the right eye longitudinal line image, left eye longitudinal line image and the parallax information are overlapped; and
a composition restriction unit which, while the right eye longitudinal line image is moved, makes the composition unit compose the right eye image data and not compose the left eye image data, and, while the left eye longitudinal line image is moved, makes the composition unit compose the left eye image data and not compose the right eye image data,
wherein when any one of the right eye longitudinal line image or the left eye longitudinal line image moves, the image based on the display data leaves unmoved.

2. The stereoscopic image display apparatus of claim 1, wherein the line image overlapping unit additionally overlaps a horizontal line image extending in the horizontal direction with the image based on the display data, and moves the horizontal line image in the vertical direction according to the manipulation input of the user while leaving the image based on the display data unmoved.

3. The stereoscopic image display apparatus of claim 1, wherein the parallax information is a ratio between the parallax between the two longitudinal line images and a display width of the display data in the horizontal direction.

4. The stereoscopic image display apparatus of claim 1, wherein the parallax information is a ratio of a distance between the display unit and a location where a subject image having the parallax between the two longitudinal line images is formed with respect to a distance between the display unit and a viewer.

5. The stereoscopic image display apparatus of claim 1, wherein the parallax information derivation unit derives the parallax information by defining relative locations of the two longitudinal line images in the horizontal direction along with the parallax between the two longitudinal line images.

6. The stereoscopic image display apparatus of claim 1, further comprising a line image changing unit which changes display states of the longitudinal line images, when the parallax between the longitudinal line images exceeds a predetermined threshold value, in order to identify that the parallax exceeds the threshold value.

7. A stereoscopic image capturing apparatus comprising:
- an imaging unit which generates right eye image data and left eye image data respectively from two optical axes that are arranged to be nearly parallel with each other or cross each other in an imaging direction;
- a composition unit which generates display data by composing the right eye image data and the left eye image data;
- a line image overlapping unit which overlaps two longitudinal line images, which are right eye longitudinal line image and left eye longitudinal line image, extending in a vertical direction with an image based on the display data, and independently moves the right eye longitudinal line image and the left eye longitudinal line image in a horizontal direction according to a manipulation input of a user;
- a parallax information derivation unit which derives parallax information on parallax between the right eye longitudinal line image and the left eye longitudinal line image;
- a parallax information overlapping unit which additionally overlaps the parallax information with the image based on the display data, on which the right eye longitudinal line image and the left eye longitudinal line image are overlapped;
- a display unit which displays the images based on the display data, on which the right eye longitudinal line image, the left eye longitudinal line image and the parallax information are overlapped; and
- a composition restriction unit which, while the right eye longitudinal line image is moved, makes the composition unit compose the right eye image data and not compose the left eye image data, and, while the left eye longitudinal line image is moved, makes the composition unit compose the left eye image data and not compose the right eye image data, wherein when any one of the right eye longitudinal line image or the left eye longitudinal line image moves, the image based on the display data leaves unmoved.

8. A stereoscopic image display method comprising:
- acquiring right eye image data and left eye image data having horizontal parallax;
- generating display data by composing the right eye image data and the left eye image data;
- overlapping two longitudinal line images, which are right eye longitudinal line image and left eye longitudinal line image, extending in a vertical direction with an image based on the display data, during moving of the right eye longitudinal line image in a horizontal direction according to a manipulation input of a user, composing the right eye image data and not composing the left eye image data, and during moving of the left eye longitudinal line image in the horizontal direction according to the manipulation input of the user, composing the left eye image data and not composing the right eye image data;
- deriving parallax information on parallax between the right eye longitudinal line image and the left eye longitudinal line image;
- additionally overlapping the parallax information with the image based on the display data, on which the right eye longitudinal line image and the left eye longitudinal line image are overlapped; and
- displaying the image based on the display data, on which the right eye longitudinal line image, the left eye longitudinal line image and the parallax information are overlapped, wherein when any one of the right eye longitudinal line image or the left eye longitudinal line image moves, the image based on the display data leaves unmoved.

* * * * *